(12) United States Patent
Yasuda et al.

(10) Patent No.: US 12,151,553 B2
(45) Date of Patent: Nov. 26, 2024

(54) UTILITY VEHICLE

(71) Applicant: Kubota Corporation, Osaka (JP)

(72) Inventors: Toshifumi Yasuda, Sakai (JP); Yuki Monde, Sakai (JP); Hiroyuki Suzuki, Sakai (JP); Akihiro Takami, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/627,684

(22) Filed: Apr. 5, 2024

(65) Prior Publication Data

US 2024/0343112 A1    Oct. 17, 2024

(30) Foreign Application Priority Data

Apr. 17, 2023    (JP) .................. 2023-067250

(51) Int. Cl.
*B60K 17/16*    (2006.01)
*B62D 3/02*    (2006.01)
*B62D 21/02*    (2006.01)

(52) U.S. Cl.
CPC .............. *B60K 17/16* (2013.01); *B62D 3/02* (2013.01); *B62D 21/02* (2013.01)

(58) Field of Classification Search
CPC ........... B60K 17/16; B62D 3/02; B62D 21/02
See application file for complete search history.

(56) References Cited

U.S. PATENT DOCUMENTS

| | | | | |
|---|---|---|---|---|
| 4,432,428 A | * | 2/1984 | Kondo | B60K 17/16 180/360 |
| 5,161,637 A | * | 11/1992 | Hirano | B60K 17/00 180/378 |
| 6,715,576 B2 | * | 4/2004 | Filho | B60B 35/1036 180/209 |
| 10,703,202 B2 | * | 7/2020 | Funderburg | B60K 17/36 |
| 2012/0018973 A1 | | 1/2012 | Fujii et al. | |

FOREIGN PATENT DOCUMENTS

JP    201225226 A    2/2012

* cited by examiner

*Primary Examiner* — Faye M Fleming
(74) *Attorney, Agent, or Firm* — The Webb Law Firm

(57) ABSTRACT

In a utility vehicle, a differential mechanism is provided with a cylindrical portion and a connection portion, respectively on a first end portion and a second end portion of the differential mechanism in a front-rear direction of a body of the utility vehicle. A vehicle fame is provided with a first holder for allowing the vehicle frame to hold the cylindrical portion and a second holder for allowing the vehicle frame to hold the connection portion. The first holder has a through hole receiving the cylindrical portion and is configured to lock the cylindrical portion by the through hole. The second holder includes a first attachment piece and a second attachment piece. The second holder is configured to, with the connection portion between the first and second attachment pieces, connect the connection portion to the first and second attachment pieces by a connection bolt extending in a vehicle width direction.

3 Claims, 4 Drawing Sheets

UTILITY VEHICLE

CROSS-REFERENCE TO RELATED APPLICATION

This application claims priority to Japanese Patent Application No. 2023-067250 filed Apr. 17, 2023, the disclosure of which is hereby incorporated by reference in its entirety.

BACKGROUND OF THE INVENTION

Field of the Invention

The present invention relates to a utility vehicle.

Description of Related Art

Japanese Unexamined Patent Application Publication No. 2012-25226 discloses a utility vehicle including: a differential mechanism (differential gear) held by a vehicle frame; an input shaft projecting in a front-rear direction of a body from one of two end portions of the differential mechanism in the front-rear direction; and wheel drive shafts (drive shaft) which extend laterally outward of the body from respective lateral sides of the differential mechanism and are configured to transmit a motive power from the input shaft to wheels.

In this type of utility vehicle, a vehicle frame is provided with an under plate supporting the differential mechanism from below, and the differential mechanism is connected to the vehicle frame, by fastening the differential mechanism with the under plate using a connection bolt which is inserted in a hole of the under plate from below and engaged with the differential mechanism.

SUMMARY OF THE INVENTION

In the conventional utility vehicle, when a large torque driving the wheels is applied and a force is generated in a direction to push up a differential mechanism relative to the vehicle frame, the force causes a stress on a connection bolt in an extending direction of the connection bolt. In addition, the connection bolt projects downward from the underplate and thus tends to be brought into contact with stones or the like on an uneven ground, which may damage the connection bolt. Moreover, when the differential mechanism is to be connected to the vehicle frame, a worker has to go under the under plate and fasten the connection bolt with looking upward. As a result, the fastening becomes difficult and the connection takes time.

The present invention provides a utility vehicle having a structure for connecting the differential mechanism to the vehicle frame, which structure is unlikely to be damaged, and with which structure the differential mechanism can be quickly connected to the vehicle frame.

A utility vehicle according to an embodiment of the present invention includes: a body including a vehicle frame; wheels; a differential mechanism held by the vehicle frame; an input shaft projecting in a front-rear direction of the body from a first end portion of the differential mechanism in the front-rear direction; and wheel drive shafts extending laterally outward of the body from respective lateral sides of the differential mechanism, the wheel drive shafts being configured to transmit a motive power from the input shaft to the wheels, the differential mechanism being provided with a cylindrical portion fitted around the input shaft and projecting from the first end portion; and a connection portion projecting in the front-rear direction from a second end portion of the differential mechanism in the front-rear direction, the vehicle frame being provided with a first holder for allowing the vehicle frame to hold the cylindrical portion, and a second holder for allowing the vehicle frame to hold the connection portion, the first holder having a through hole receiving the cylindrical portion, the first holder being configured to lock the cylindrical portion by the through hole such that the vehicle frame holds the cylindrical portion, and the second holder including a first attachment piece and a second attachment piece arranged in a width direction of the body, the second holder configured to, with the connection portion between the first attachment piece and the second attachment piece, connect the connection portion to the first attachment piece and the second attachment piece by a connection bolt extending in the width direction through the first attachment piece, the connection portion, and the second attachment piece such that the vehicle frame holds the connection portion.

With the above configuration, by inserting the cylindrical portion into the through hole, the first holder locks the cylindrical portion by the through hole, so that the vehicle frame holds the cylindrical portion. In addition, by attaching the connection portion to the first attachment piece and second attachment piece by the connection bolt, the connection portion is connected to the second holder, so that the vehicle frame holds the connection portion. Accordingly, by simply inserting the cylindrical portion into the through hole and bringing the connection bolt into a connected state, the differential mechanism can be connected to the vehicle frame. By simply inserting the cylindrical portion into the through hole, the first holder locks the cylindrical portion. In addition, the connection bolt inserted in the vehicle width direction into the holes of the connection portion, the first attachment piece and the second attachment piece is brought into the connected state from a laterally outer side of the vehicle, and thus a worker can easily bring the connection bolt into the connected state. Therefore, the differential mechanism can be quickly connected to the vehicle frame.

The connection bolt is inserted in the vehicle width direction into the connection portion, the first attachment piece and the second attachment piece. Accordingly, even when a force is generated in a direction to push up the differential mechanism, the force does not cause a stress on the connection bolt in the extending direction of the connection bolt. In addition, even on an uneven ground, stones or the like are unlikely to be brought into contact with the connection bolt, and the structure for connecting the differential mechanism to the vehicle frame is prevented from being damaged.

With the above configuration, by inserting into the through hole the cylindrical portion fitted around the input shaft, the input shaft is received in the through hole. Therefore, there is no need to provide the first holder with a special measure for preventing the contact between the input shaft and the first holder. As a result, the structure of the first holder can be made simple.

The utility vehicle may preferably be configured such that the vehicle frame includes right and left longitudinal frame members extending in the front-rear direction, and a connection frame member being disposed between the right and left longitudinal frame members and connecting the right and left longitudinal frame members to each other, and the first holder, the first attachment piece, and the second attachment piece project upward from the connection frame member.

With the above configuration, the cylindrical portion and the connection bolt are positioned above the connection frame member. Accordingly, stones are unlikely to be brought into contact with the cylindrical portion and the connection bolt, and a structure to connect the differential mechanism to the vehicle frame are prevented from being damaged.

The utility vehicle may preferably be configured such that the wheels are front wheels which are turnable, the differential mechanism is for the front wheels, the utility vehicle further includes: a steering operation mechanism for turning the wheels, the steering operation mechanism being disposed rearward and upward of the differential mechanism; and a third holder standing on the vehicle frame and being connected to the steering operation mechanism for allowing the vehicle frame to hold the steering operation mechanism, and the first holder includes a lock portion locking an upper portion of the third holder.

With the above configuration, by locking the upper portion of the third holder with the lock portion of the first holder, the first holder and the third holder are fixed to each other. As a result, the first holder is reinforced by the third holder, while the third holder is reinforced by the first holder. Therefore, without introducing a special reinforcing member, the rigidity of the structure for connecting the differential mechanism and the steering operation mechanism to the vehicle frame can be enhanced.

DESCRIPTION OF THE INVENTION

An embodiment of the present invention will be described below with reference to the drawings.

Figure 1:
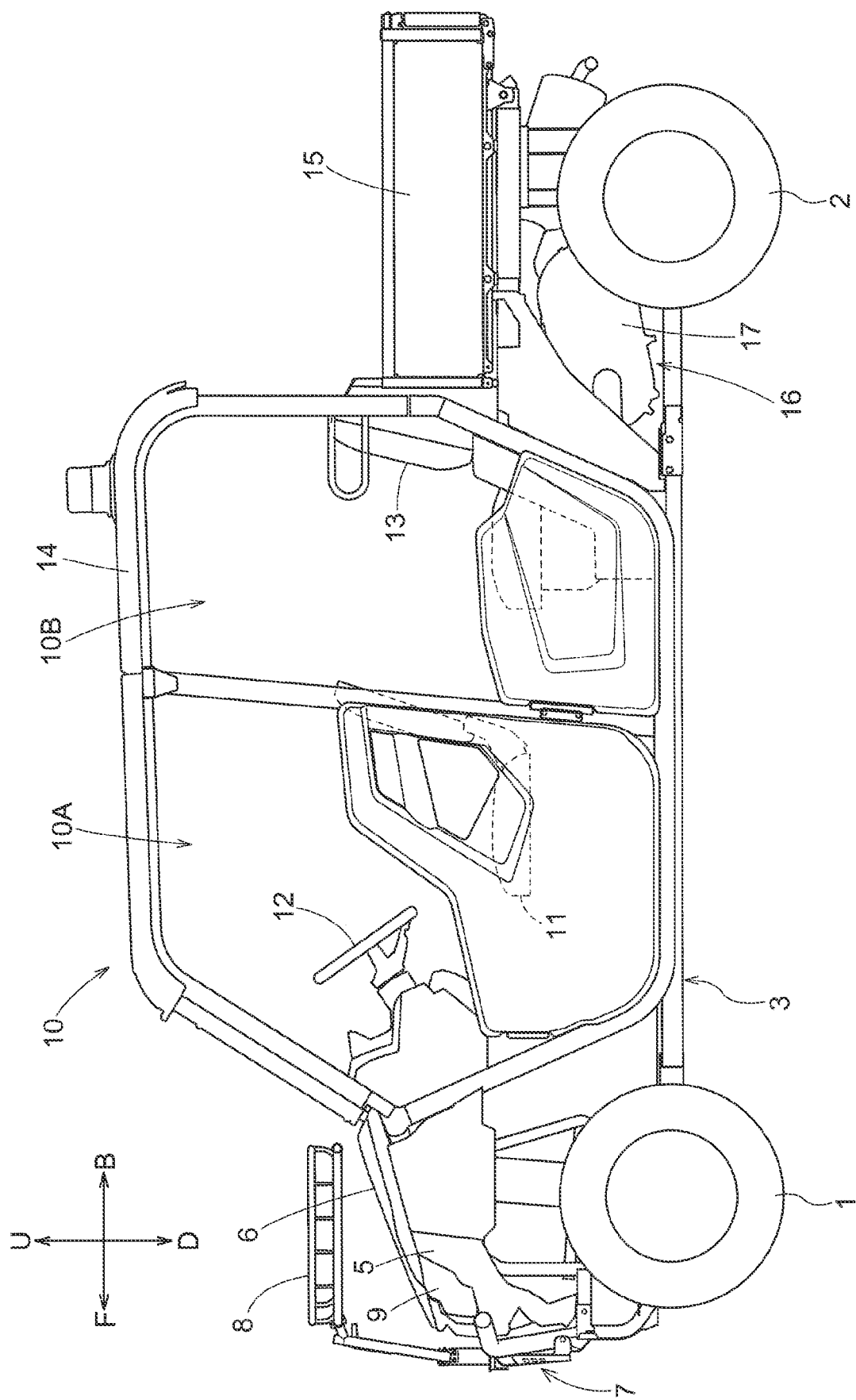
FIG. 1 is a side view of a utility vehicle as seen from a left side.

In the following description, regarding the body of the utility vehicle, a side indicated by an arrow F in FIG. 1 is "front" side of the body, a side indicated by an arrow B is "rear" side of the body, a side indicated by an arrow U is "upper" side of the body, a side indicated by an arrow D is "lower" side of the body, the front side of the sheet of FIG. 1 is "left" side of the body, and the rear side of the sheet of FIG. 1 is "right" side of the body. A right-left direction of the body corresponds to a transversal direction of the body, and may also be referred to as "width" direction or "lateral" direction of the body. A front-rear direction of the body corresponds to a longitudinal direction of the body.

Entire Structure of Utility Vehicle

A utility vehicle shown in FIG. 1 is used for various purposes, such as load carriage and recreation. The utility vehicle includes a body 3 with a pair of right and left front wheels 1 (which may be also referred to as "wheels") which are turnable (steerable) and drivable, and a pair of right and left rear wheels 2 which are drivable. A front part of the body 3 includes a front bumper 5, a front cover 6 and a front guard 7. A front rack 8 is above the front cover 6. To the front bumper 5, right and left head lights 9 are attached. An intermediate part in a front-rear direction of the body 3 includes a ride section 10. The ride section 10 includes: a front ride section 10A including a driver's seat 11, a steering wheel 12 for changing orientation of the front wheels 1, and a passenger seat; a rear ride section 10B including a rear seat 13; and a ROPS (roll-over protection system) 14 defining a space for the front ride section 10A and a space for the rear ride section 10B.

A cargo box 15 is rearward of the ride section 10. A motor section 16 is below the cargo box 15. The motor section 16 includes an engine (not shown), a travel power transmission 17 for changing a motive power of the engine, transmitting the motive power to the front wheels 1 and the rear wheels 2, and the like.

Front Wheel

Figure 2:
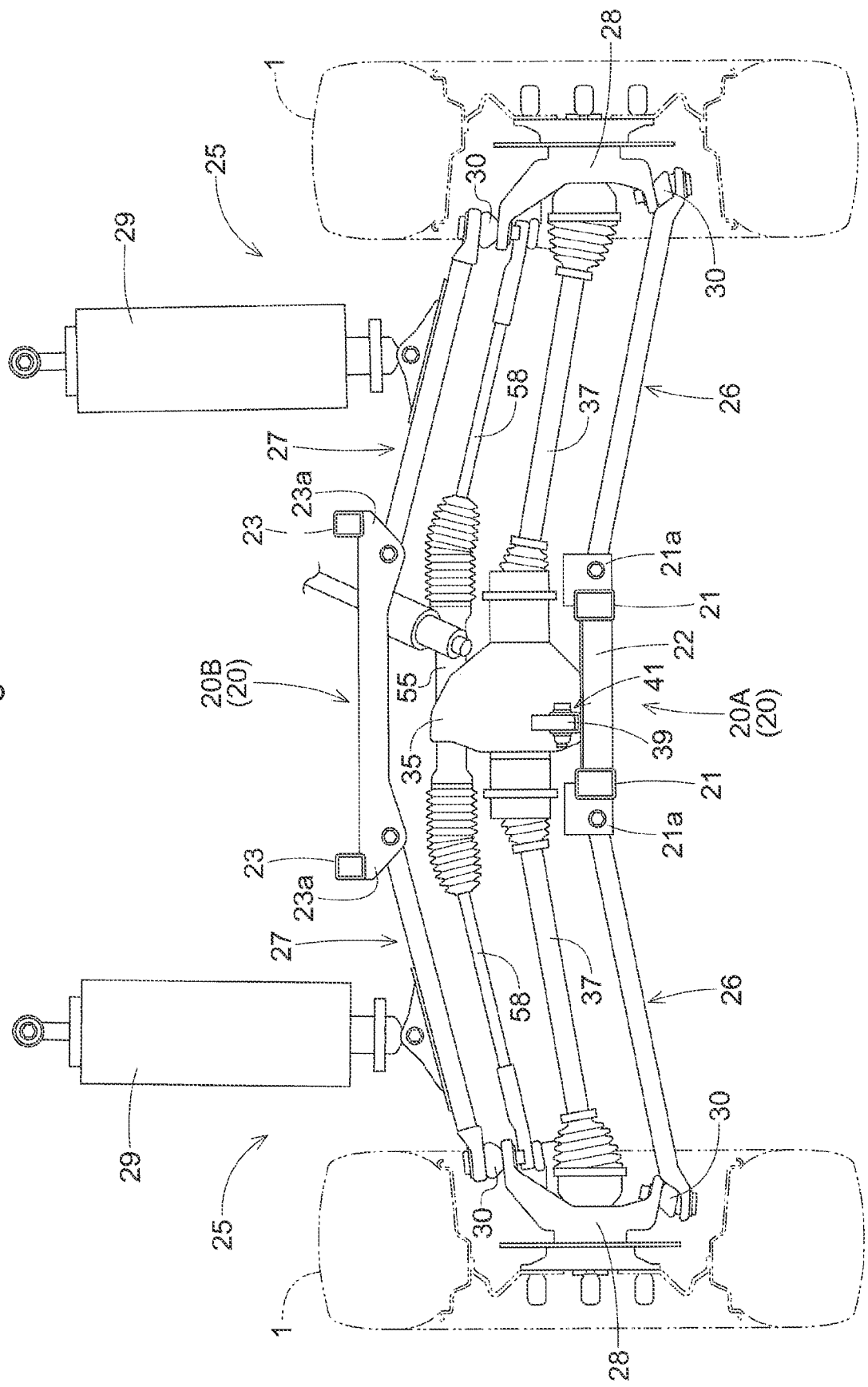
FIG. 2 is a front view of a suspension mechanism of front wheels.

As shown in FIG. 2, the right and left front wheels 1 are held by a vehicle frame 20 through respective suspension mechanisms 25.

Specifically, as shown in FIG. 2, a front portion of the vehicle frame 20 includes a lower front frame member 20A (which may be also referred to as "vehicle frame"), and an upper front frame member 20B above the lower front frame member 20A.

Figure 3:
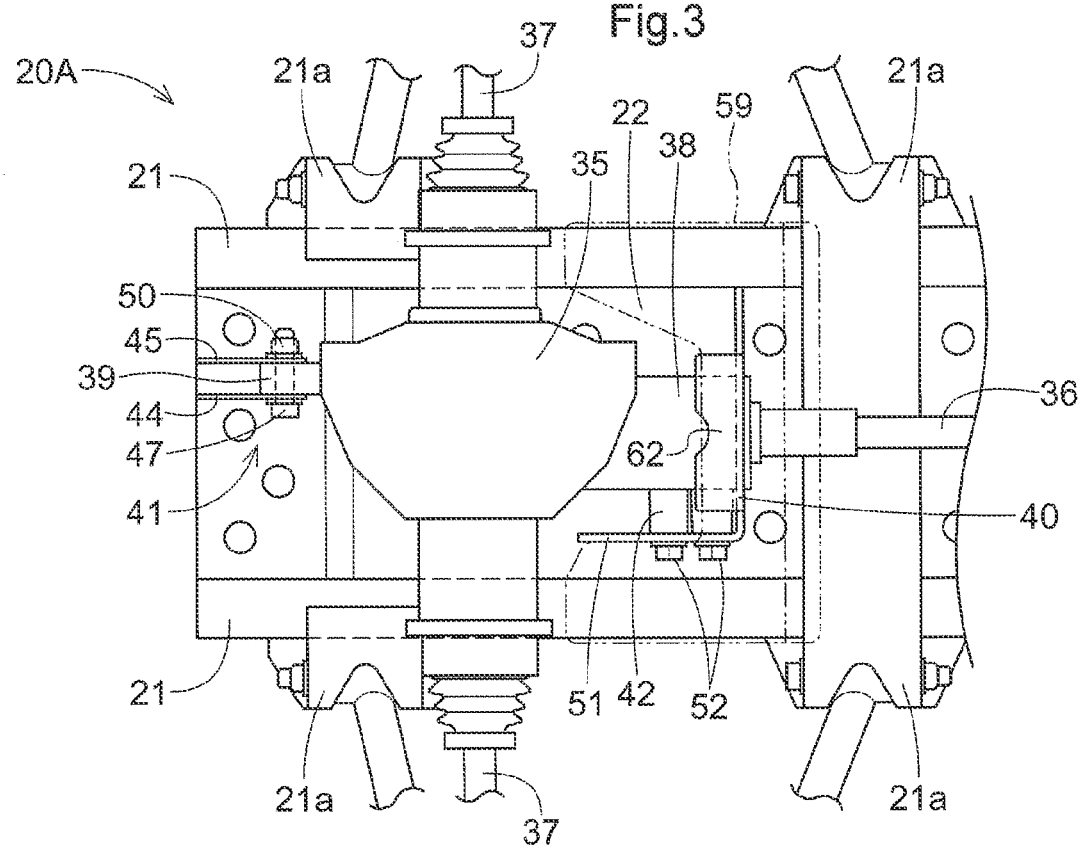
FIG. 3 is a plan view showing a structure connecting a differential mechanism to a vehicle frame.
Figure 4:
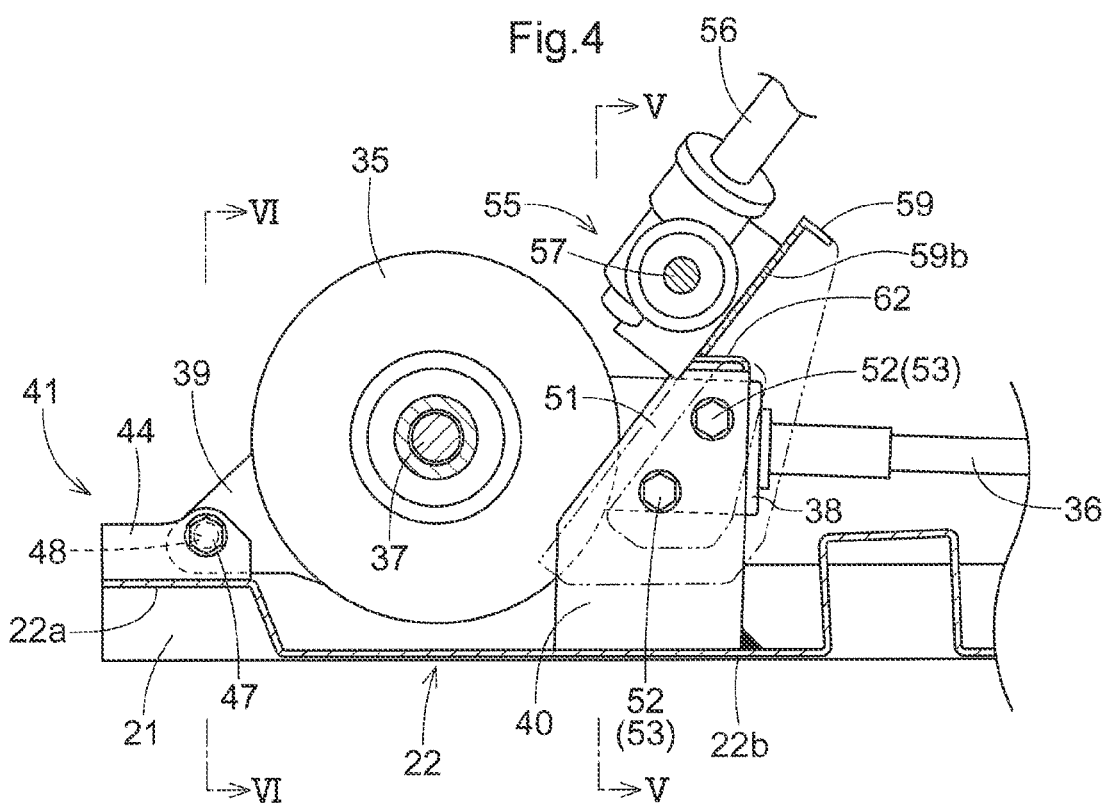
FIG. 4 is a side view showing the structure connecting the differential mechanism to the vehicle frame.

As shown in FIGS. 2 and 3, the lower front frame member 20A includes right and left lower longitudinal frame members 21 extending in the front-rear direction of the body, and a connection frame member 22 connecting the right and left lower longitudinal frame members 21 to each other. The connection frame member 22 is disposed between the right and left lower longitudinal frame members 21, and welded to the right and left lower longitudinal frame members 21. The connection frame member 22 is a steel plate bent in such a manner that a front portion 22a thereof is above a rear portion 22b as shown in FIGS. 3 and 4. The upper front frame member 20B includes right and left upper longitudinal frame members 23 extending in the front-rear direction of the body, as shown in FIG. 2.

As shown in FIG. 2, the suspension mechanisms 25 of the respective front wheels 1 each include a lower arm 26 vertically swingably held by the corresponding lower longitudinal frame member 21, an upper arm 27 vertically swingably held by the corresponding upper longitudinal frame member 23, and a knuckle 28 held by a free end of the lower arm 26 and a free end of the upper arm 27 and is connected to the corresponding front wheel 1 in a rotatable manner. To the upper arm 27, a cushion mechanism 29 including a shock absorber (not shown) and a coil spring (not shown) is connected.

The lower longitudinal frame member 21 holds the lower arm 26 through front and rear supports 21a (see FIGS. 2 and 3) disposed on the lower longitudinal frame member 21. The upper longitudinal frame member 23 holds the upper arm 27 through front and rear supports 23a (see FIG. 2) disposed on the upper longitudinal frame member 23. The lower arm 26 and the upper arm 27 support the knuckle 28 through ball joints 30. The knuckle 28 is held by the lower arm 26 and the upper arm 27 in a turnable and swingable manner by the action of the ball joints 30. With this, the right and left front wheels 1 are held by the lower arm 26 and the upper arm 27 in a turnable and swingable manner.

Drive of Front Wheel

As shown in FIGS. 2 and 3, between the right and left front wheels 1, a differential mechanism 35 is connected to and held by the lower front frame member 20A of the vehicle frame 20. The differential mechanism 35 is provided with an input shaft 36 and wheel drive shafts 37. The input shaft 36 projects rearward from a rear end portion (first end portion) of the differential mechanism 35, and the wheel drive shafts 37 extend outward from respective lateral ends of the differential mechanism 35.

The input shaft 36 is connected to an output shaft (not shown) of the travel power transmission 17 in the motor section 16 through a rotation shaft (not shown). In the motor section 16, a motive power from the engine is input to the travel power transmission 17, output therefrom as a front-wheel driving force, transmitted to the input shaft 36 through the rotation shaft (not shown), and input to the differential mechanism 35. The wheel drive shaft 37 on the left side is connected to a left front wheel shaft (not shown), and the front-wheel driving force input to the differential mechanism 35 is transmitted to the left front wheel 1 by the left wheel drive shaft 37. The wheel drive shaft 37 on the right side is connected to a right front wheel shaft (not shown), and the front-wheel driving force input to the differential mechanism 35 is transmitted to the right front wheel 1 by the right wheel drive shaft 37.

As shown in FIGS. 3 and 4, the differential mechanism 35 is connected to the lower front frame member 20A through a cylindrical portion 38 and a connection portion 39 provided for the differential mechanism 35, and respectively through a first holder 40 and a second holder 41 provided for the lower front frame member 20A. Further, the differential mechanism 35 is connected to the lower front frame member 20A through a rear transversal connection portion 42 and the first holder 40. The rear transversal connection portion 42 is provided for the differential mechanism 35.

Figure 5:
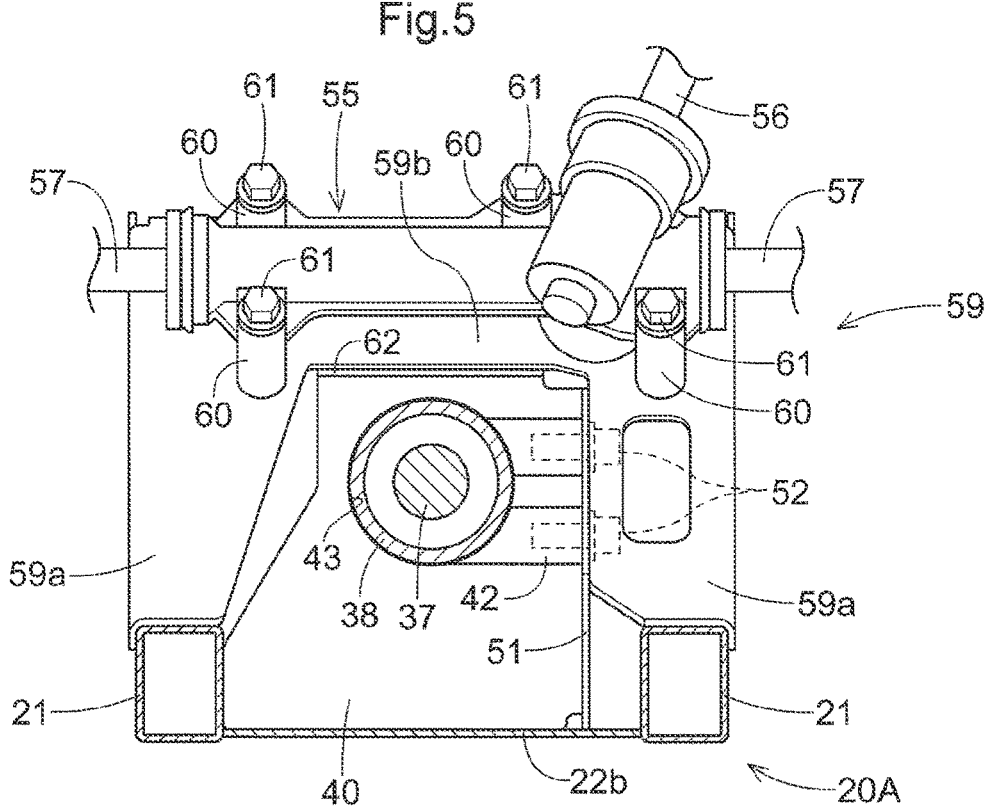
FIG. 5 is a cross-sectional view taken along a line V-V in FIG. 4.

Specifically, as shown in FIGS. 3 and 4, the cylindrical portion 38 projects rearward from the rear end portion (first end portion) of the differential mechanism 35. The cylindrical portion 38 is configured to fit around the input shaft 36. As shown in FIGS. 4 and 5, the first holder 40 projects upward from the connection frame member 22 of the lower front frame member 20A. The first holder 40 is connected to the connection frame member 22 by welding.

As shown in FIGS. 3, 4 and 5, the first holder 40 has a through hole 43 through which the cylindrical portion 38 is removably inserted. The cylindrical portion 38 is received by the through hole 43 and the first holder 40 locks the cylindrical portion 38 with use of the through hole 43, so that the connection frame member 22 holds the locked cylindrical portion 38.

Figure 6:
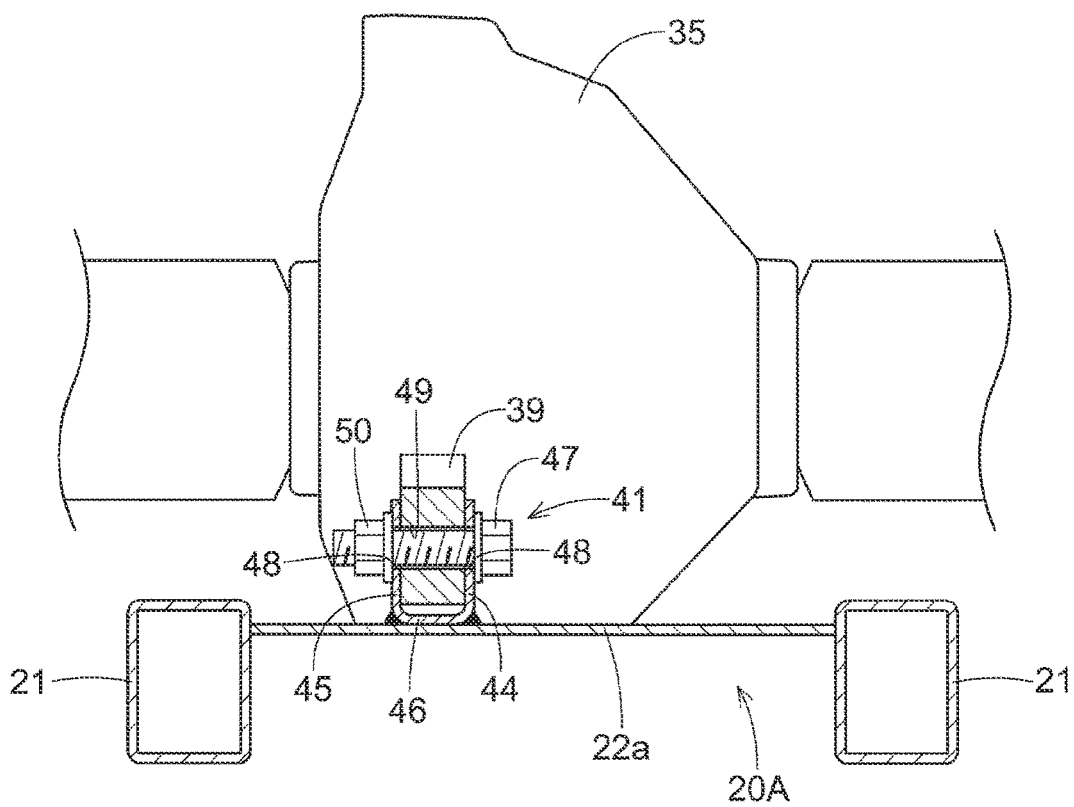
FIG. 6 is a cross-sectional view taken along a line VI-VI in FIG. 4.

As shown in FIGS. 3 and 4, the connection portion 39 projects forward from a front end portion (second end portion) of the differential mechanism 35. As shown in FIGS. 3, 4 and 6, the second holder 41 includes a first attachment piece 44 and a second attachment piece 45 arranged in a vehicle width direction at an interval therebetween. The first attachment piece 44 and the second attachment piece 45 stand from a connection piece 46 connecting a lower portion of the first attachment piece 44 and a lower portion of the second attachment piece 45. The connection piece 46 is connected to the connection frame member 22, and the first attachment piece 44 and the second attachment piece 45 project upward from the connection frame member 22. The connection piece 46 is connected to the connection frame member 22 by welding.

As shown in FIGS. 3, 4 and 6, the connection portion 39 is disposed between the first attachment piece 44 and the second attachment piece 45, and is attached to the first attachment piece 44 and the second attachment piece 45 with a connection bolt 47. As a result, the connection portion 39 is connected to the second holder 41, so that the connected connection portion 39 is held by the connection frame member 22 through the second holder 41. The connection bolt 47 has dimension allowing the connection bolt 47 to be inserted in the vehicle width direction into bolt insertion holes 48 in the first attachment piece 44 and the second attachment piece 45 and a bolt insertion hole 49 in the connection portion 39 and is configured to be fastened and fixed with a screw hole member 50, such as a nut.

As shown in FIG. 3, the rear transversal connection portion 42 projects laterally outward of the body from the cylindrical portion 38 of the differential mechanism 35. The rear transversal connection portion 42 projects from a portion of the cylindrical portion 38 positioned forward of a portion of the cylindrical portion 38 passing the through hole 43. Accordingly, the rear transversal connection portion 42 does not hinder the insertion of the cylindrical portion 38 into the through hole 43. The first holder 40 includes a side holder 51 in contact with the rear transversal connection portion 42 from a laterally outer side.

As shown in FIG. 3, the side holder 51 is connected to the rear transversal connection portion 42 with connection bolts 52, so that the first holder 40 is connected to the rear transversal connection portion 42 and the connection frame member 22 holds the rear transversal connection portion 42 through the first holder 40. The connection bolts 52 are inserted into respective bolt insertion holes 53 in the side holder 51 from a laterally outer side and extend in the vehicle width direction. The connection bolts 52 are engaged with respective screw holes of the rear transversal connection portions 42. The connection bolts 52 are also fastened in the vehicle width direction and connected to the side holder 51 and the rear transversal connection portion 42.

The differential mechanism 35 may be connected to the lower front frame member 20A in the following manner.

The cylindrical portion 38 of the differential mechanism 35 is inserted into the through hole 43 of the first holder 40 from a front side, so that the first holder 40 locks the cylindrical portion 38 with use of the through hole 43 and the first holder 40 holds the cylindrical portion 38. As a result, the connection frame member 22 holds the cylindrical portion 38 through the first holder 40. With an appropriate length of the cylindrical portion 38 projecting rearward from the through hole 43, the bolt insertion hole 49 of the connection portion 39 coincides with the bolt insertion holes 48 of the first attachment piece 44 and the second attachment piece 45 (i.e., the holes communicate with each other). The connection bolt 47 is inserted into the bolt insertion holes 48 of the first attachment piece 44 and the second attachment piece 45 and the bolt insertion hole 49 of the connection portion 39, and the screw hole member 50 is screwed on a distal end portion of the connection bolt 47. By fastening the connection bolt 47 and the screw hole member 50, the connection portion 39 is attached to the first attachment piece 44 and the second attachment piece 45 with the connection bolt 47, and the second holder 41 holds the connection portion 39. As a result, the connection frame member 22 holds the connection portion 39 through the second holder 41. With the first holder 40 locking the cylindrical portion 38 and the second holder 41 holding the connection portion 39, a screw hole in the rear transversal connection portion 42 coincides with the bolt insertion hole 53 in the side holder 51 (i.e., the holes communicate with each other). The connection bolt 52 is inserted into the bolt insertion hole 53 of the side holder 51 and screwed into a screw hole in the rear transversal connection portion 42. By fastening these members, the rear transversal connection portion 42 is connected to the side holder 51 with the connection bolt 52, and the first holder 40 holds the rear transversal connection portion 42. As a result, the connection frame member 22 holds the rear transversal connection portion 42 through the first holder 40. With the connection frame member 22 holding the cylindrical portion 38 and the rear transversal connection portion 42 with the first holder 40, and the connection frame member 22 holding the connection portion 39 with the second holder 41, the differential mechanism 35 is connected to and held by the lower front frame member 20A.

Steering Operation of Front Wheel

As shown in FIGS. 2 and 4, a steering operation mechanism 55 is disposed rearward and upward of the differential mechanism 35. An upper portion of the steering operation mechanism 55 includes an input shaft 56 which is connected to the steering wheel 12 through a rotation shaft (not shown). The steering operation mechanism 55 includes, on each of right side and left side, an output shaft 57 connected to a knuckle arm through a tie rod 58.

When the steering wheel 12 is operated to turn, the input shaft 56 of the steering operation mechanism 55 is turned, which in turn operates the steering operation mechanism 55. The right and left tie rods 58 are pushed or pulled by the steering operation mechanism 55, and the right and left knuckles 28 are swung by the respective tie rods 58. As a result, the right and left front wheels 1 are turned in a direction corresponding to a turning direction of the steering wheel 12, by a steering angle corresponding to an operation stroke (which may be referred to as "operation amount") of the steering wheel 12.

As shown in FIGS. 4 and 5, the steering operation mechanism 55 is attached to a third holder 59. The steering operation mechanism 55 is connected to and held by the lower front frame member 20A through the third holder 59.

Specifically, as shown in FIGS. 3, 4 and 5, the third holder 59 stands on the lower front frame member 20A. The third holder 59 is in an arch-like shape as seen in the front-rear direction, and includes right and left standing portions 59a arranged in the vehicle width direction at an interval, and a transverse portion 59b connecting upper portions of the right and left standing portions 59a. As shown in FIG. 5, the third holder 59 stands on the right and left lower longitudinal frame members 21 of the lower front frame member 20A, with the first holder 40 being disposed between the right and left standing portions 59a. The right and left standing portions 59a are connected to the respective lower longitudinal frame members 21 by welding.

As shown in FIGS. 4 and 5, the steering operation mechanism 55 is provided with a plurality of connection portions 60 at positions dispersed in the vehicle width direction and in an upper-lower direction. The steering operation mechanism 55 is attached to the third holder 59 by connecting the plurality of connection portions 60 with a front face of the transverse portion 59b of the third holder 59 with use of respective connection bolts 61.

As shown in FIGS. 4 and 5, the first holder 40 includes a lock portion 62 in an upper portion of the first holder 40. The lock portion 62 locks the transverse portion 59b, which is an upper portion of the third holder 59, from below. By locking the first holder 40 and the upper portion of the third holder 59 with use of the lock portion 62, the first holder 40 and the third holder 59 are connected through locking, and the first holder 40 is reinforced by the third holder 59, while the third holder 59 is also reinforced by the first holder 40.

Alternative Embodiments (1) The embodiment described above shows an example in which the front wheels 1 is held by the vehicle frame 20 through the suspension mechanism 25. However, the utility vehicle may not have the suspension mechanism 25, and an axle case connecting the differential mechanism 35 to the front wheels 1 may be fixed to the vehicle frame 20.

(2) The embodiment described above shows an example in which the differential mechanism 35 is for the front wheels 1. However, the differential mechanism 35 is not limited to those for front wheels 1, and may be for rear wheels 2. In a case where the differential mechanism 35 is for rear wheels 2, the front end portion (first end portion) of the differential mechanism 35 is provided with the input shaft 36 and the cylindrical portion 38, and the rear end portion (second end portion) of the differential mechanism 35 is provided with the connection portion 39.

(3) The embodiment described above shows an example in which the utility vehicle includes the rear transversal connection portion 42 and the side holder 51. However, the utility vehicle may not include the rear transversal connection portion 42 and the side holder 51.

(4) The embodiment described above shows an example in which the utility vehicle includes the connection frame member 22, and the first holder 40, the first attachment piece 44 and the second attachment piece 45 project upward from the connection frame member 22. However, the utility vehicle may not include the connection frame member 22, and instead, a connection member specialized for connecting and holding the first holder 40 and the lower longitudinal frame member 21 may be provided and another connection member specialized for connecting the first attachment piece 44 and the second attachment piece 45 to the lower longitudinal frame member 21 and holding them, so that the first holder 40, the first attachment piece 44 and the second attachment piece 45 are provided on the lower front frame member 20A.

(5) The embodiment described above shows an example in which the utility vehicle includes the lock portion 62. However, the utility vehicle may not include the lock portion 62.

INDUSTRIAL APPLICABILITY

The present invention is applicable to a utility vehicle having a differential mechanism held by a vehicle frame.

The invention claimed is:

1. A utility vehicle comprising:
a body comprising a vehicle frame;
wheels;
a differential mechanism held by the vehicle frame;
an input shaft projecting in a front-rear direction of the body from a first end portion of the differential mechanism in the front-rear direction; and
wheel drive shafts extending laterally outward of the body from respective lateral sides of the differential mechanism, the wheel drive shafts configured to transmit a motive power from the input shaft to the wheels, and
wherein:
the differential mechanism comprises:
a cylindrical portion fitted around the input shaft and projecting from the first end portion; and
a connection portion projecting in the front-rear direction from a second end portion of the differential mechanism in the front-rear direction,
the vehicle frame comprises:
a first holder for allowing the vehicle frame to hold the cylindrical portion, and
a second holder for allowing the vehicle frame to hold the connection portion, the first holder has a through hole receiving the cylindrical portion, the first holder configured to lock the cylindrical portion by the through hole such that the vehicle frame holds the cylindrical portion, and the second holder comprising a first attachment piece and a second attachment piece arranged in a width direction of the body, the second holder configured to, with the connection portion between the first attachment piece and the second attachment piece, connect the connection portion to the first attachment piece and the second attachment piece by a connection bolt extending in the width direction through the first attachment piece, the connection portion, and the second attachment piece such that the vehicle frame holds the connection portion.

2. The utility vehicle according to claim 1, wherein:

the vehicle frame comprises:

right and left longitudinal frame members extending in the front-rear direction, and a connection frame member disposed between the right and left longitudinal frame members and connecting the right and left longitudinal frame members to each other, and the first holder, the first attachment piece, and the second attachment piece project upward from the connection frame member.

3. The utility vehicle according to claim 1, wherein:

the wheels are front wheels which are turnable, the differential mechanism is for the front wheels, the utility vehicle further comprises:

a steering operation mechanism for turning the wheels, the steering operation mechanism disposed rearward and upward of the differential mechanism; and a third holder standing on the vehicle frame and connected to the steering operation mechanism for allowing the vehicle frame to hold the steering operation mechanism, and the first holder comprises a lock portion locking an upper portion of the third holder.

\* \* \* \* \*